Feb. 25, 1969    W. JOHN    3,429,207
PHOTOELECTRICALLY CONTROLLED COPYING APPARATUS
Filed Aug. 14, 1964    Sheet 1 of 4

INVENTOR
W. JOHN

BY
ATTORNEY

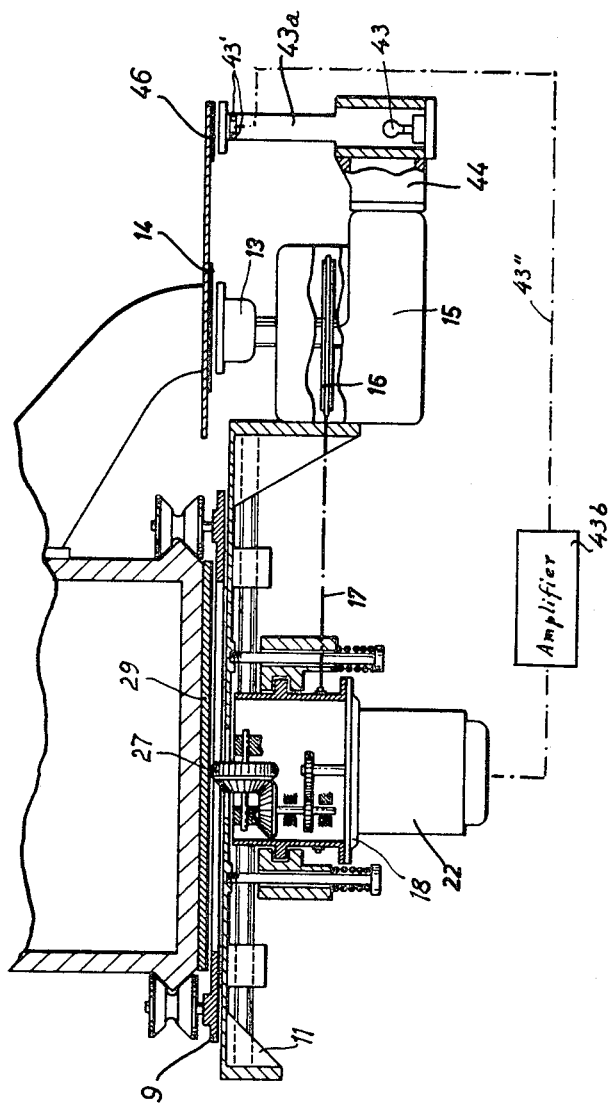

United States Patent Office 3,429,207
Patented Feb. 25, 1969

3,429,207
PHOTOELECTRICALLY CONTROLLED
COPYING APPARATUS
Willy John, Selb, Germany, assignor to Gebruder Netzsch,
Selb, Germany
Filed Aug. 14, 1964, Ser. No. 389,643
Claims priority, application Germany, Aug. 16, 1963,
N 21,675
U.S. Cl. 82—14                                                     7 Claims
Int. Cl. B23b 3/28; B23a 35/00

ABSTRACT OF THE DISCLOSURE

A method and apparatus for reproducing contours of a workpiece from a two-dimensional contour pattern and more specifically for contouring unworked blanks of the raw material for insulators made of procelain or similar materials, the contouring being effected with the aid of a photoelectric tracer apparatus tracing a contour pattern.

The present invention has, among others, the characteristics that a method and apparatus is used which permits the use of different speeds of the movement of the contouring tool whenever this is desired although normally a predetermined uniform speed would be used.

According to the invention the contouring tool is moved under the control of a conventional photoelectric tracing apparatus which traces a contour pattern represented by a black-and-white drawing. According to the prior art the unworked blank of raw material is first subjected to a preliminary operation on a machine that may be classified as a lathe so as to give it a suitable shape and size for starting the contouring operation, and the contouring operation thereafter is carried out on such lathe-type machine by means of a hollow contour template which is applied stepwise in consecutive positions to the blank proceeding from top to bottom thereof so that in each step one of the transverse ridges of an insulator is formed. Between the operations of forming two consecutive ridges the template has to be moved into an idle position. Hereafter the template is moved forward in horizonal direction toward the center or axis of the workpiece and during this movement the raw material located between the location of two adjacent ridges is removed. At the end of this last movement the template is lifted somewhat and thereafter lowered again in order to produce in this manner the undercut below the respectively upper ridge. Hereafter the template may be moved again into its starting position and lowered another step to a position adapted to start the contouring of the next ridge portion of the insulator. It is evident that this method and apparatus for contouring a workpiece like an insulator with a plurality of ridges along its length is rather unsatisfactory because the procedure is time consuming and because the devices used in the contouring operation have to be operated manually; in addition the conventional system entailed also the use of rather expensive steel patterns representing the desired contour and required for guiding the above-mentioned hollow templates.

It is therefore one object of this invention to provide for a method and apparatus for the purpose set forth above by means of which the contouring operations can be carried out more efficiently and more accurately.

It is another object of this invention to provide for a method and apparatus as stated above which is comparatively simple and likely to give satisfactory service for an extended period of time.

It will be seen that the disadvantages of the conventional system are overcome according to the invention because a tool which is curled up at its forward end and which can be used also for the rough turning operations before the actual contouring is controlled in its movements along the blanks by means of a conventional photoelectric tracer apparatus which traces a two-dimensional contour pattern representing the desired contour of, e.g. an insulator in such a manner that by the movement of the tool along a continuous path first the contour of the insulator is produced until the tool reaches its lowest operative position whereafter it is kept stationary until the completely contoured insulator is removed from the machine and a new blank is placed in work position. Thereafter the tool is moved along a straight line vertically upward during which movement it rough turns the blank so as to give it a preliminary shape before the ensuing contouring operation. A remarkable advantage of the apparatus according to the invention resides in the fact that for instance in an insulator having a plurality of ridges spaced from each other along its length the diameters of the individual ridges, the spaces therebetween and even the shape of the various ridges do not have to be identical throughout while this was an inescapable consequence of the use of the above described hollow templates known to the prior art. Consequently, the apparatus according to the invention is more versatile in its application to varous jobs. Also the replacement of the conventional steel mater patterns by a simple black-and-white drawing as a contour pattern results in a much greater economy of the operation.

In view of the above the invention includes a method of reproducing contours of a workpiece from a two-dimensional contour pattern, comprising the steps of: scanning with a photoelectrical tracer the two-dimensional contour of the pattern; moving a tool along the outside of the workpiece so as to follow, under control of said tracer, a path corresponding to the path of said tracer along the pattern contour; and varying the speed of said movement of said tool along its path depending upon the shape of said pattern contour in such a manner that said speed is decreased as the radius of a curved portion of said pattern contour decreases.

In another aspect the invention includes in an apparatus for reproducing contours of a workpiece from a two-dimensional contour pattern and including lathe means for contouring a workpiece, said lathe means including a frame and means for rotating said workpiece about its longitudinal axis relative to said frame when the workpiece is in work position on said lathe means, in combination, tool support means for moving a tool relative to said frame and along a workpiece in work position, said tool support means including a first slide means movable along said frame in direction parallel with said longitudinal axis, and a second slide means supported by said first slide means and movable relative thereto in a direction transverse of said longitudinal axis and adapted to carry a tool in a position for contouring said workpiece; tool support moving means including a friction plate mounted on said frame and extending parallel with said longitudinal axis and directionally controllable friction drive means on said second slide means cooperating with said friction plate for moving said first and second slide means jointly in a variety of directions along said friction plate; two-dimensional pattern means mounted along said frame and carrying a two-dimensional pattern contour; and photoelectric tracer means carried by said second slide means and located opposite said pattern means for tracing said pattern contour and including a motor controlled by said tracer means in accordance with said pattern contour being traced and operatively connected with said friction drive means for controlling the direction of movement produced thereby in such a manner that said tool is moved by said tool support means along a path corresponding to said pattern contour.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 6 is a top view similar to that of FIG. 4, showing the arrangement of FIG. 5, partly in sections along the line A–B of FIG. 5.

Figure 1:
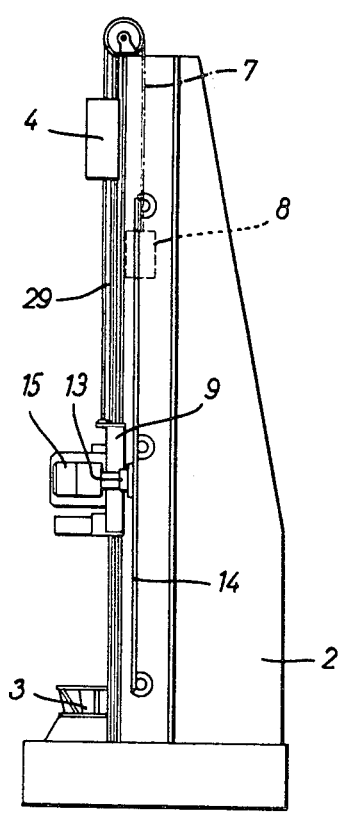
FIG. 1 is a lateral elevation of an apparatus according to the invention.
Figure 2:
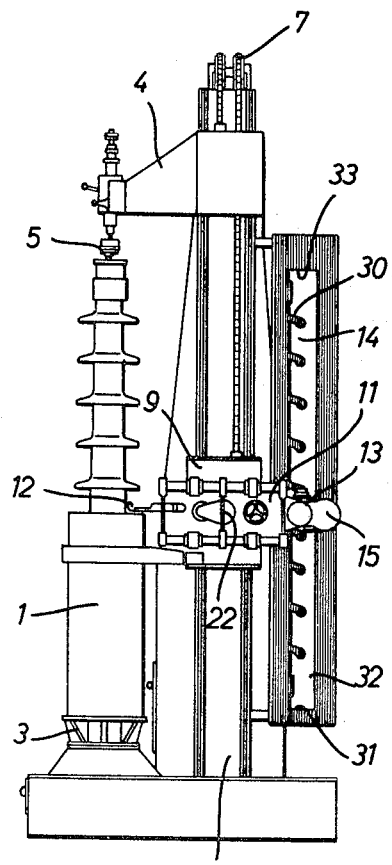
FIG. 2 is a front elevation of the apparatus of FIG. 1 including the illustration of a partly contoured blank for a multi-ridge insulator and including the illustration of the corresponding black-and-white template.
Figure 3:
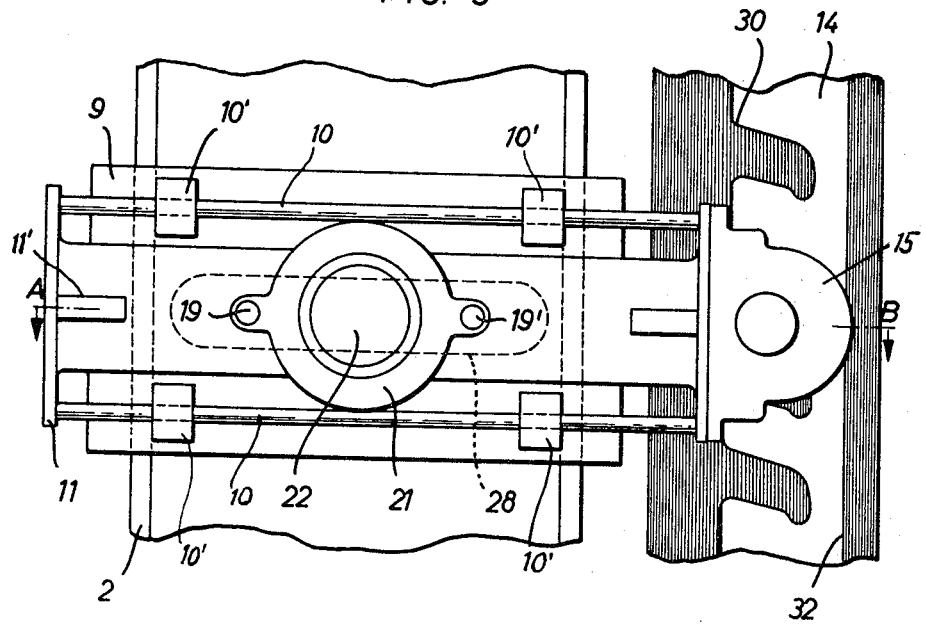
FIG. 3 is a fractional front view at a larger scale showing the tool supports (without a tool), the tool support moving means, the photoelectric tracer means and a portion of a tool dimensional pattern.

It can be seen from FIGS. 1 and 2 that the apparatus according to the invention comprises a structure similar to a vertical lathe which includes a frame 2, a tailstock 4 and a rotatable spindle or workholder 3 which can be rotated by means of a conventional, preferably a variable speed motor not shown in the drawing. An unworked blank 1 of raw material may be placed in work position between the workholder 3 and the center tip of the tailstock 4. The center tip 5 should be rotatable relative to the tailstock 4, and the latter should be adjustable vertically along the frame 2. As can be seen best from FIG. 4 together with FIGS. 1–3, tool support means are provided which are movable (while being balanced by weight 8 suspended by cable 7) relative to the vertical column of the frame 2 and which comprise a first slide member 9 which is spaced from the column of frame 2 and is guided by rollers 6 for vertical movement along said column, and which carries a second slide member 11 movable horizontally relative to the first slide member 9 since it comprises two guide bars 10 slidable in corresponding bushings 10′ mounted on the first slide member 9. At the left-hand end as seen in the drawing the second slide member 11 is provided with means 11′ for holding a tool 12 in working position as can be seen from FIG. 2. At the opposite end the second slide member 11 carries a conventional photoelectric tracer apparatus 13 e.g. of the type known by the trade name Photoscop and manufactured by Adolf Messer, G.m.b.H., Frankfurt am Main, Germany, which apparatus in well known manner comprises a source of light e.g. an electric bulb and an optical system including a light stop whereby a spot of light of about 2 mm. diameter is projected onto a contour pattern like the black-and-white contour drawing prepared on and carried by a pattern carrier plate or sheet 14. The light reflected from the pattern varies as the tracer apparatus moves relative to the pattern and any deviation of the projected light spot from the edge or line that in the contour drawing represents the desired contour is registered by a photocell arrangement exposed to the reflected light and such variation of the amount of reflected light is converted into a corresponding change of electric potential which is applied conventionally via an electronic amplifier to a control motor 15 associated with the tracer appratus 13 and operatively connected by a chain, belt or the like 17 with the tool support moving means described further below.

The tool support moving means comprise a friction drive arrangement which is controlled by the above-mentioned control motor 15. The friction drive arrangement comprises a stationary friction plate 29 mounted on the front face of the above-mentioned column of the frame 2 as can be seen from FIGS. 1 and 4, said friction plate 29 extending over the whole vertical length of the column of the frame 2 or at least over a length which corresponds to the overall length of the workpiece or blank to be contoured. The second slide member 11 carries a control head 18 which is rotatable in a control head housing 21 about an axis perpendicular to the surface of the friction plate 29. The housing 21 is movable to some extent in the direction of the just mentioned axis of rotation by means of guide pins 19 and 19′ carried by the second slide member 11. Springs 20 and 20′ are inserted between the heads of the pins 19, 19′, respectively, and the rear face of the housing 21 so that the latter is continuously urged toward the plate 29. The control head 19 carries a motor 22 which drives via a set of gears 23, 24 and bevel gears 25, 25′ a friction wheel 27 rotatable about the axis of a shaft 26 also supported in the control head 18. The circumference of the friction wheel 27 which may be knurled projects somewhat beyond the face of the slide member 11 opposite the plate 29 so that under the action of the springs 20, 20′ the friction wheel 27 is constantly kept in frictional engagement with the surface of the friction plate 29. It should be noted that the axis of rotation of the control head 18 intersects with the plane of the surface of the friction plate 29 at the point where the circumference of the friction wheel 27 engages the surface of the plate 29.

Figure 4:
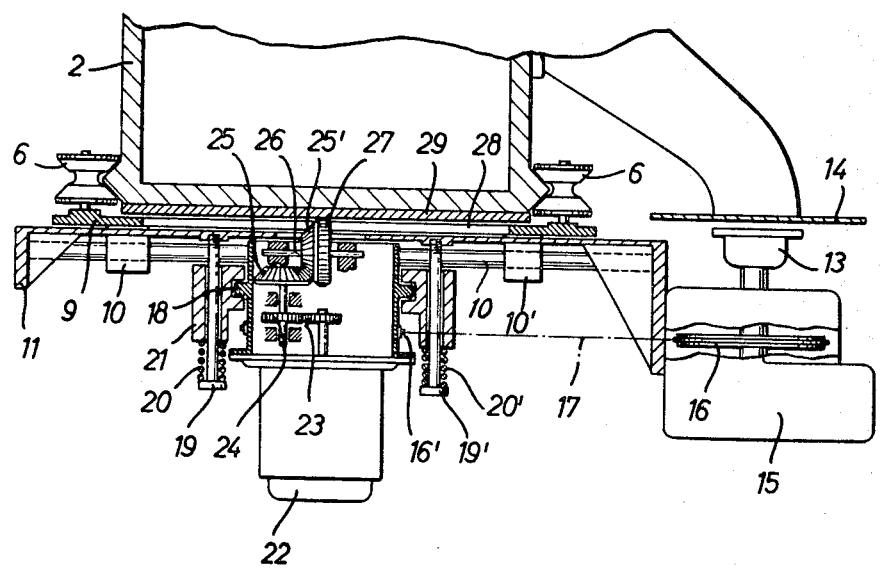
FIG. 4 is a partial top view, partly in section along the line A–B of FIG. 3, of the arrangement illustrated by FIG. 3.

It will be understood that if the control head happens to be in the position illustrated by FIG. 4 i.e. the direction of the axis of rotations of the friction wheel 27 is horizontal, then the rotation of the wheel 27 by the motor 22 will cause the slide member 9 to travel along the column of frame 2 in a straight vertical direction while the second slide member 11 remains stationary relative to the first slide member 9. Consequently, in this case the tool carried by the member 11 would move also along a straight vertical path. However, if the control head 18 is rotated about its horizontal axis of rotation the direction of the axis of rotation of the wheel 27 will be changed accordingly and consequently the friction wheel will travel on the surface of the plate 29 along a path which is more or less inclined anywhere between 0° and 90° toward left or right against the above described straight vertical path. This means that depending upon the amount of rotary displacement of the control head 18 the combination of first and second slide members and consequently the tool 12 will move along a path which is determined by vertical and horizontal components either one varying between 0 and 100 percent of vertical and horizontal movement, respectively.

As mentioned above the control head 18 is controlled by the photoelectric tracer apparatus 13 due to an operative connection between the control motor 15 and the control head 18. As can be seen best from FIG. 4 the motor 15 carries a sheave or sprocket 16 which is connected by a belt, chain or the like 17 with a corresponding groove or sprocket arranged around the circumference of the control head 18 so that any rotary movement of the member 16 produced by the motor 15 under control of the tracer apparatus 13 is faithfully transmitted to the control head 18. Since the rotary movements of the motor 15 and the member 16 are controlled by the tracer apparatus 13 in accordance with the contour traced by the apparatus 13 from the contour pattern 14 the angular positions of the friction wheel 27 will vary in exact conformity with the contour traced by the apparatus 13 and consequently the tool 12 will move along a path which conforms with the contour line fixed on the contour pattern 14.

In operations, after the blank 1 has been placed in work position as described above between the workholder 3 and the rotary center 5 and after the pattern carrier 14 has been attached in the proper position as illustrated by FIG. 2 one would start the not shown motor which rotates the tool holder 3 and thus the blank 1 and then the motor 22 would be started while the control head 18 is in the position illustrated by FIG. 4. Supposedly the tool support arrangement namely the slide members 9 and 11 have been set to a position relative to the frame 2 in which the tool 12 carried by the member 11 just about touches the circumference of the workpiece 1 at its lower end. This position would correspond substantially to that which the light spot of the photoelectric tracer 13 occupies when it registers with the lower right-hand corner of the pattern contour i.e. where the contour lines 31 and 32 meet. Consequently, under these circumstances the tool support arrangement with the tool would now start moving straight upward along a vertical line corresponding to the straight contour line 32 which is being traced by the apparatus 13. In this manner the outside of the workpiece 1 is given a substantially cylindrical shape. When the tracer apparatus 13 reaches the upper end of the line 32 it will cause the motor 15 to turn the control head 28 with the friction wheel 27 90° to the left so that now the first slide member 9 stands still while the second slide member 11 with the tool 12 moves horizontally to the left until it reaches the left end of line 33. Now, again under the action of the tracing apparatus 13 the control head 18 is again turned 90° further in a counterclockwise direction and now the tool support arrangement 9, 11 with the tool 12 will start its movement downwardly along the raw material workpiece, the tracer light following the characteristic pattern contour 30 and correspondingly guiding the tool 12 so as to contour the workpiece 1 exactly in accordance with the pattern contour 14. It will be noted in this respect that the spacing and the diameters of the various ridges of the intended insulator form may vary among each other in any way desired, depending only on the contour drawing on the pattern member 14. FIG. 2 shows a blank one-half finished. As the tracing and contouring continues the light spot of the tracer apparatus 13 will finally reach the left-hand end of the bottom line 31 of the pattern contour which causes the slide member 11 with the tool 12 to move horizontally to the right until it reaches the above described starting point at the corner where the lines 31 and 32 meet. It is of great advantage if a stop switch 31' is mounted on the base of the frame 2 in such a position that the stop switch 31' is actuated by some portion of the slide member 11 (which term in this case includes any attachment mounted on the member 11) when the tracer reaches the above described position of the light spot at the corner where lines 31 and 32 meet. Although no electrical connections are shown it will be understood that the actuation of the stop switch 31' would interrupt the contouring operation while the tool 12 is moved to an idle position as far away as possible from the center of the rotary movement of the tool holder 3, or at least far away enough that the finished contoured workpiece 1 can be removed from the machine and replaced by a new unworked blank. Now, in a conventional manner the stop switch 31' may be shunted or otherwise brought back into circuit-closing position whereby the above described cycle of operation is again started.

It will be noted that the tool 12 has a curled cutting portion as can be seen best from FIG. 2. This shape of the tool is very well suited for removing material from a blank constituted by the still plastic raw material for porcelain insulators and similar materials. The shape of this upwardly curled cutter makes it easier to produce the required undercut portion underneath each of the individual ridges of the insulator. Evidently the area of the tool which does the actual cutting at the given moment is not always the same. Therefore, the contour line appearing on the black-and-white drawing of the pattern can not be geometrically identical with the actual contour of the desired insulator if an axial section of the insulator would be compared with the pattern 14. In other words in designing the pattern contour the peculiar characteristic shape of the tool 12 is to be taken into consideration.

In the contouring procedure described above evidently the cutting speed of the tool 12 relative to the blank 1 is a uniform speed depending on the speed of rotation of the blank 1 and on the speed of the motor 22, both these speeds being predetermined but uniform.

However, in practice it has been found that in many cases a uniform cutting speed, or more particularly a uniform speed of the movement of the tool 12 along its path results in defects of the finished workpiece e.g. of insulators of a rather involved profile like the one illustrated in FIG. 2. The defects consist in cracks or fissures appearing after the drying or firing operation and are caused by excessive cutting speed of the tool during the contouring operation. It has been found that such defects most frequently occur along the lower sides of the insulator ridges and at portions of the contour having a comparatively small radius.

The inventor has found that these defects can be eliminated completely if during the contouring operation the cutting speed of the tool is reduced while it travels along portions of its path which correspond to the abovementioned endangered areas of the insulator profile.

In order to solve this problem the invention includes means for changing the speed of the tool movement in selected portions of its path. For this purpose the embodiment according to FIGS. 5 and 6 which otherwise corresponds exactly to the embodiment described above, comprises additionally means for arranging on the pattern holder 14 a second contour pattern 46 substantially similar to the above described pattern which is traced by the tracer apparatus 13. However, for cooperation with the second pattern 46 an attachment is mounted on the tracer and motor assembly 13, 15 and comprises a holder or mounting frame 44 which is equipped to hold a photoelectric scanner in a position facing the pattern 46 at the same time when the tracer apparatus 13 faces the pattern 14. The photoelectric scanner apparatus comprises a housing 43a which contains a light source like a bulb 43 and optical means, not shown, for projecting a beam of light onto the pattern 46. This light is reflected from the pattern 46 and received by two photocells 43' connected in conventional manner by a line 43'' with an amplifier 43b from where a supply current is furnished to the motor 22 in the control head 18. As can be seen from FIG. 5 the pattern 46 contains a contour line which in certain portions is reinforced i.e. has greater than normal width. Consequently, as the tracer apparatus 13 follows the contour line of the pattern 14 the scanner device will simultaneously follow the contour line of the pattern 46 provided that the two patterns or raher their contour lines correspond to each other and are located relatively to each other correctly. The amount of light reflected from the area of the contour line of pattern 46 and impinging on the photocells 43' will vary depending upon the width of the contour line of pattern 46. Wherever the contour line is wider than normal the corresponding light reflection will be reduced and consequently the current or voltage applied to the motor 22 will be reduced which means that the speed of rotation of the friction wheel 27 and correspondingly the speed of movement of the tool 12 will be reduced until the scanner apparatus 43a reaches again a portion of the contour line of pattern 46 which has normal width.

Figure 5:
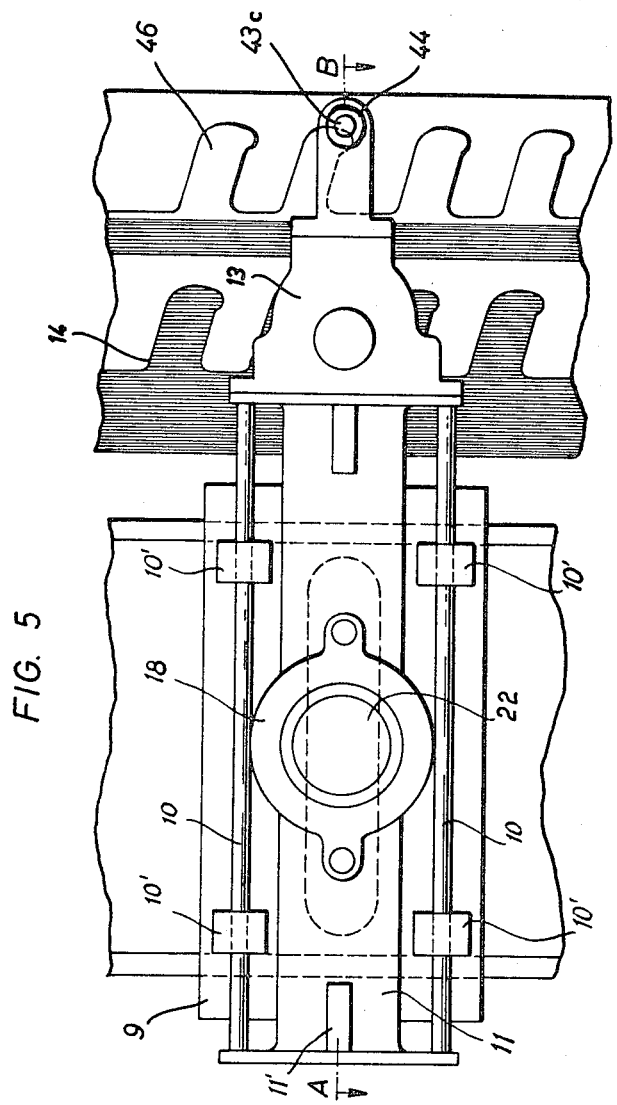
FIG. 5 is a partial front elevation of a modified form of the apparatus according to the invntion, the view being similar to that of FIG. 3.

The just described arrangement can be used to great advantage also for producing the pattern 46 so as to conform exactly with an already existing pattern 14. In order to do this the photoelectric scanning apparatus 43a is removed from the mounting attachment 44 and replaced by a scriber of any suitable kind 43c as shown by FIG. 5 and then, without a workpiece 1 being in work position on the machine, the machine is operated in the manner described above for the contouring operation. However, in the present case the scriber 43c will scribe on a suitable material placed on the pattern holder the contour line of the pattern 46 as illustrated in FIG. 5. Necessarily, this contour line will exactly conform in shape and relative position with the already existing contour pattern 14. Hereafter those portions of the contour line of pattern 46 which are desired to be scanned at a reduced speed are simply made wider or reinforced by hand or any other suitable means.

It will be understood that each of the elements described above, or two or more together, may also find a useful application in other types of a method apparatus for reproducing contours of a workpiece from a two-dimensional contour pattern differing from the types described above.

While the invention has been illustrated and described as embodied in a method apparatus for reproducing contours of a workpiece from a two-dimensional contour pattern with the aid of photoelectric tracer and scanning means, it is not intended to be limited to the details shown, since various modification and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of reproducing contours of a workpiece from at least one two-dimensional contour pattern having a pattern line of varying width, comprising the steps of: scanning the two-dimensional contour of the pattern with a first and a second photoelectrical tracer; moving a tool along the outside of the workpiece so as to follow, under control of said first tracer, a path corresponding to the path of said tracer along the pattern contour; and varying the speed of said movement of said tool along its path under control of said second tracer depending upon the width of said pattern line.

2. A method of reproducing contours of a workpiece from a two-dimensional contour pattern, comprising the steps of: preparing a two-dimensional contour pattern by making a line-drawing of the desired contour and giving the contour line of the pattern comparatively greater width at curved portions of said pattern contour wherein the contour reproducing operation a reduced work speed is desired; scanning the two-dimensional contour of the pattern with a first and a second photoelectrical tracer; moving a tool along the outside of the workpiece so as to follow, under control of said first tracer, a path corresponding to the path of said tracer along the pattern contour, and varying the speed of said movement of said tool along its path under control of said second tracer depending upon the width of the contour line of the pattern being scanned, in such a manner that the speed of said movement of said tool along its path varies depending upon the shape of said pattern contour in such a manner that said speed is decreased as the radius of a curved portion of said pattern contour decreased.

3. In an apparatus for reproducing contours of a workpiece from a two-dimensional contour pattern and including vertical lathe means for contouring a workpiece, said lathe means including an upright frame and means for rotating said workpiece about its longitudinal vertical axis relative to said frame when the workpiece is in work position on said lathe means, in combination, tool support means for moving a tool relative to said frame and along a workpiece in work position, said tool support means including a first slide means movable vertically along said frame in direction parallel with said longitudinal axis, and a second slide means supported by said first slide means and movable relative thereto in a direction transverse to said longitudinal axis and adapted to carry a tool in a position for contouring said workpiece; tool support moving means including a friction plate mounted on said frame and extending parallel with said longitudinal axis and directionally controllable friction drive means on said second slide means cooperating with said friction plate for moving said first and second slide means jointly in a variety of directions along said friction plate and biasing means for maintaining said friction drive means and said friction plate in frictional engagement with each other; two-dimensional pattern contour; photoelectric tracer means carried by said second slide means and located opposite said pattern means for tracing said pattern contour and including a motor controlled by said tracer means in accordance with said pattern contour being traced and operatively connected with said friction drive means for controlling the direction of movement produced thereby in such a manner that said tool is moved by said tool support means along a path corresponding to said pattern contour; and counter balancing means connected to said tool support means for counter balancing the weight of the latter and that of the elements carried by said tool support means.

4. An apparatus according to claim 3, including stop switch means mounted on said frame in a predetermined position along the path of said second slide means for being actuated when said second slide means reaches a predetermined position and for stopping the operation of said tool support moving means upon such actuation.

5. In an apparatus for reproducing contours of a workpiece from a two-dimensional contour pattern and including vertical lathe means for contouring a workpiece, said lathe means including a frame and means for rotating said workpiece about its vertical longitudinal axis relative to said frame when the workpiece is in work position on said lathe means, in combination, tool support means for moving a tool relative to said frame and along a workpiece in work position, said tool support means including a first slide means movable vertically along said frame in direction parallel with said longitudinal axis, and a second slide means supported by said first slide means and horizontally movable relative thereto and adapted to carry a tool in a position for contouring said workpiece; tool support moving means including a friction plate mounted on said frame and extending parallel with said longitudinal axis and a control head mounted on said second slide means and rotatable relative thereto about an axis perpendicular to the surface of said friction plate, said control head including a first motor and a friction wheel driven thereby and projecting from said tool support means toward said surface of said friction plate, biasing means causing frictional engagement between said friction wheel and said surface of said friction plate so that rotation of said friction wheel causes a corresponding movement, depending upon the orientation of said control head, of said tool support means and thus of said tool relative to said frame; two-dimensional pattern means mounted along said frame and carrying a two-dimensional pattern contour; photoelectric tracer means carried by said second slide means and located opposite said pattern means for tracing said pattern contour and including a second motor controlled by said tracer means in accordance with said pattern contour being traced and operatively connected with said control head for controlling the orientation of said control head and consequently the direction of movement produced thereby in such a manner that said tool is moved by said tool support means along a path corresponding to said pattern contour; and counter balancing means connected to said tool support means for counter balancing the weight of the latter and that of the elements carried by said tool support means.

6. In an apparatus for reproducing contours of a workpiece from a two-dimensional contour pattern and including vertical lathe means for contouring a workpiece, said lathe means including a frame and means for rotating said workpiece about its vertical longitudinal axis relative to said frame when the workpiece is in work position on said lathe means, in combination, tool support means for moving a tool relative to said frame and along a workpiece in work position, said tool support means including a first slide means movable vertically along said frame in direction parallel with said longitudinal axis, and a second slide means supported by said first slide means and horizontally movable relative thereto and adapted to carry a tool in a position for contouring said workpiece; tool support moving means including a friction plate mounted on said frame and extending parallel with said longitudinal axis and a control head mounted on said second slide means and rotatable relative thereto about an axis perpendicular to the surface of said friction plate, said control head including a first motor and a friction wheel driven thereby and projecting from said tool support means toward said surface of said friction plate, biasing means causing frictional engagement between said friction wheel and said surface of said friction plate so that rotation of said friction wheel causes a corresponding movement, depending upon the orientation of said control head, of said tool support means and thus of said tool relative to said frame; two-dimensional pattern means mounted along said frame and carrying a first two-dimensional pattern contour of uniform characteristic throughout its length, and a second two-dimensional pattern contour adjacent to said first pattern contour and including the same contour as said first one except that said contour is represented by a contour line of varying width, the normal width of said contour line changing where the corresponding portion of the contour of said workpiece requires a slower speed of the tool movement; photoelectric tracer means carried by said second slide means and located opposite said pattern means for tracing said first pattern contour and including a second motor controlled by said tracer means in accordance with said first pattern contour being traced and operatively connected with said control head for controlling the orientation of said control head and consequently the direction of movement produced thereby in such a manner that said tool is moved by said tool support means along a path corresponding to said first pattern contour; and photoelectric scanner means including a source of light and photo-responsive resistor means mounted on said second slide means in a position for projecting light on said second contour pattern and to scan the reflection of light, and electric control means between said photoresponsive resistor means and said first motor for changing the speed of the latter in accordance with the changes of the width of said contour line of said second pattern contour.

7. An apparatus according to claim 6, wherein said photoelectric scanner means include mounting means for removably holding said source of light and said photoresponsive resistor means in operative position, and scriber means adapted to be held in operative position by said mounting means and to scribe a pattern contour on a surface when said source of light and said resistor means are removed therefrom so that said apparatus can be used in two alternative modes of operation, in one mode for contouring a workpiece in accordance with said first pattern contour and for varying the speed of movement of said tool in accordance with said second pattern contour scanned by said photoelectric scanner means, and in the other mode for producing on a suitable surface a pattern contour in line form corresponding to said first pattern contour traced by said photoelectric tracer means.

References Cited
UNITED STATES PATENTS

| | | | |
|---|---|---|---|
| 2,085,127 | 6/1937 | Sparkes | 90—13.99 |
| 2,086,153 | 7/1937 | Bickel | 90—62.1 |
| 2,419,641 | 4/1947 | Hart | 90—62.1 |
| 2,445,041 | 7/1948 | Scholz | 90—62.1 |
| 2,522,851 | 9/1950 | Tyrner | 90—62.1 |
| 2,532,421 | 12/1950 | Rathje | 90—62.1 |
| 2,628,539 | 2/1953 | Neergaard | 90—62.1 |
| 3,004,166 | 10/1961 | Greene | 90—62.1 |
| 3,063,698 | 11/1962 | Hancock | 90—62.1 |
| 3,124,692 | 3/1964 | Brouwer | 90—62.1 |
| 3,207,013 | 9/1965 | Ponnath | 82—14 |
| 2,102,505 | 12/1937 | Berthiez | 90—13.01 |
| 2,151,743 | 3/1939 | Chladek | 90—13.01 |
| 2,154,326 | 4/1939 | Dorin | 82—2.4 |
| 2,478,929 | 8/1949 | Lochman | 90—13.5 |

GERALD A. DOST, *Primary Examiner.*

U.S. Cl. X.R.

90—62